(12) United States Patent
Hirai

(10) Patent No.: US 10,990,338 B2
(45) Date of Patent: Apr. 27, 2021

(54) INFORMATION PROCESSING SYSTEM AND NON-TRANSITORY COMPUTER READABLE MEDIUM

(71) Applicant: FUJI XEROX CO., LTD., Tokyo (JP)

(72) Inventor: Kazunari Hirai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/558,890

(22) Filed: Sep. 3, 2019

(65) Prior Publication Data
US 2020/0272393 A1 Aug. 27, 2020

(30) Foreign Application Priority Data
Feb. 26, 2019 (JP) .............................. JP2019-032830

(51) Int. Cl.
*G06F 3/12* (2006.01)
*G06F 40/20* (2020.01)
*G06F 40/103* (2020.01)

(52) U.S. Cl.
CPC .......... *G06F 3/1275* (2013.01); *G06F 3/1208* (2013.01); *G06F 40/103* (2020.01); *G06F 40/20* (2020.01)

(58) Field of Classification Search
CPC ...... G06F 3/1275; G06F 40/103; G06F 40/20; G06F 3/1208
USPC ....................................................... 358/1.15
See application file for complete search history.

(56) References Cited

U.S. PATENT DOCUMENTS

| 6,502,076 B1* | 12/2002 | Smith ................... G06Q 30/02 705/14.54 |
| 7,358,502 B1* | 4/2008 | Appleby ................ G03B 42/04 250/370.14 |
| 10,114,609 B2* | 10/2018 | Annett .................... G06F 3/167 |
| 10,438,083 B1* | 10/2019 | Rivard ................... G06K 9/344 |
| 2017/0003923 A1 | 1/2017 | Hane |
| 2019/0171698 A1* | 6/2019 | Wang .................... G06F 40/151 |

FOREIGN PATENT DOCUMENTS

JP 2017-16315 A 1/2017

OTHER PUBLICATIONS

Kurohashi et al. "A Syntactic Analysis Method of Long Japanese Sentences based on Coordinate Structures' Detection." Journal of Natural Language Processing, 1994, vol. 1, No. 1, pp. 35-57.
Harada et al. "Improvement of Speed and Accuracy of Japanese Semantic Analysis System SAGE and Its Accuracy Evaluation by Comparison with EDR Corpus." Journal of Information Processing of Japan, Sep. 2002, vol. 43, No. 9, pp. 2894-2901.

* cited by examiner

*Primary Examiner* — Tammy Paige Goddard
*Assistant Examiner* — Darryl V Dottin
(74) *Attorney, Agent, or Firm* — Oliff PLC

(57) ABSTRACT

An information processing system includes a dividing unit that divides a text from a user into multiple segments, an acquisition unit that acquires information on multiple predetermined operations, an associating unit that associates one of the predetermined operations with each of the segments in accordance with the segments and the information on the predetermined operations, and an output unit that outputs information on a series of the predetermined operations associated with the segments.

10 Claims, 9 Drawing Sheets

FIG. 5A

| TYPE | OPERATION NAME | PARAMETER | ACQUISITION PROCEDURE (IN ORDER FROM TOP TO BOTTOM IF MULTIPLE STEPS ARE PERFORMED) |
|---|---|---|---|
| INPUT | FAX RECEIVE | IMAGE PROCESSING APPARATUS | ACQUIRE INFORMATION ON IMAGE PROCESSING APPARATUS HAVING FAX FUNCTION OVER BROADCAST NETWORK. |
| INPUT | CONFIDENTIAL BOX | IMAGE PROCESSING APPARATUS | ACQUIRE INFORMATION ON IMAGE PROCESSING APPARATUS OVER BROADCAST NETWORK. NARROW TO IMAGE PROCESSING APPARATUS HAVING FAX FUNCTION IF WORD "FAX" IS WRITTEN IN SENTENCE SEGMENT. |
| | | BOX INFORMATION | SET DEFAULT BOX. |
| INPUT | FOLDER INPUT | INPUT FOLDER | SET DEFAULT FOLDER. |
| | | ACCESS RIGHT | SET FLOW GENERATION USER. |
| PROCESSING | OCR | OCR REGION | 1. SPECIFY OCR REGION IF SPECIFIED IN TEXT.<br>2. SPECIFY ALL OCR REGIONS IF SPECIFIC REGION IS NOT SPECIFIED IN TEXT. |
| PROCESSING | FORMAT CONVERT | POST-CONVERSION FORMAT | ACQUIRE FILE FORMAT WRITTEN IN TEXT. |
| PROCESSING | TEXT NAME | TEXT NAME | 1. SET TEXT NAME IF SPECIFIED IN TEXT.<br>2. SET ID/NAME IF TEXT NAME IS NOT SPECIFIED AND ID/NAME IS DETECTED THROUGH OCR. |
| PROCESSING | AUTOMATIC UPRIGHT STANDING | — | (NO PARAMETER) |
| PROCESSING | QR CODE | — | (NO PARAMETER) |

FROM FIG. 5A

| | | | |
|---|---|---|---|
| DELIVERY | PRINTER OUTPUT | IMAGE PROCESSING APPARATUS | ACQUIRE INFORMATION ON IMAGE PROCESSING APPARATUS HAVING PRINT FUNCTION OVER BROADCAST NETWORK. |
| | | DRIVER | SEARCH FOR DRIVER INSTALLED ON SERVER. |
| | | SHEET SIZE | SELECT SHEET SIZE AVAILABLE IN SELECTED IMAGE PROCESSING APPARATUS. |
| DELIVERY | MAIL TRANSMIT | RECIPIENT | MAIL ADDRESS OF FLOW GENERATION USER. |
| | | SENDER | MAIL ADDRESS OF SYSTEM ADMINISTRATOR. |
| | | ATTACHED TEXT | PROCESSED TEXT. |
| | | DELIVERY CONDITION | IF CONDITION, SUCH AS CONDITION INDICATING THAT AA IS BB IS SPECIFIED, THAT CONDITION IS ADDED. |
| DELIVERY | FOLDER STORE | OUTPUT FOLDER | SET DEFAULT FOLDER. |
| | | SUBFOLDER | SET PATH IF PATH IS WRITTEN PRIOR TO OR SUBSEQUENT TO KEYWORD, AND IF PATH IS NOT WRITTEN PRIOR TO OR SUBSEQUENT TO KEYWORD, SET NEW FOLDER HAVING OPERATION DATE AND TIME AS FOLDER NAME. |
| | | ACCESS RIGHT | SET FLOW GENERATION USER. |
| | | DELIVERY CONDITION | IF CONDITION, SUCH AS CONDITION INDICATING THAT AA IS BB IS SPECIFIED, THAT CONDITION IS ADDED. |
| DELIVERY | CSV OUTPUT | NAME OF OPERATION AT PRECEDING STAGE | OUTPUT ALL OPERATION NAMES AT PRECEDING STAGE IN CSV. |

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-032830 filed Feb. 26, 2019.

BACKGROUND

(i) Technical Field

The present disclosure relates to an information processing system and a non-transitory computer readable medium.

(ii) Related Art

Japanese Unexamined Patent Application Publication No. 2017-16315 discloses a workflow generation assisting apparatus. The workflow generation assisting apparatus narrows pre-registered multiple templates to selection candidates by using information on at least a subpart of parameters of multiple parameters, displays information on the selection templates as a result of a narrowing operation, and displays a selection screen that receives an operation that allows a user to select a template from the selection candidates.

Techniques of segmenting a text are disclosed. For example, a technique of performing syntactic analysis of Japanese text is disclosed in Sadao KUROHASHI, and Makoto NAGANO, "Heiretsu-kozo-no-kenshutsu-ni-motozuku Nagai-nihongo-kobun-no kaiseki (Syntactic Analysis Method of Long Japanese Sentences based on Coordinate Structures' Detection)", Journal of Natural Language Processing Vol. 1, No. 1, pp 35-57, 1994. A technique of performing semantic analysis is disclosed in Minoru HARADA, Kazuyuki TABUCHI, and Hiroyuki Oono, "Nihongo-imi-kaiseki system SAGE-no Kosokuka-kosei-dok-to Corpus-ni-yoru seido-hyoka (Improvement of Speed and Accuracy of Japanese Semantic Analysis System SAGE and Its Accuracy Evaluation by Comparison with EDR Corpus)", Journal of Information Processing of Japan Vol. 43, No. 9, pp 2894-2901, September 2002.

When a specific job is performed, the specific job is divided into finer segments. However, frequently, a user may not be used to a segmentation of the specific job. The user may not be able to successfully divide the job into the finer segments or may take time even if the job has been successfully divided.

SUMMARY

Aspects of non-limiting embodiments of the present disclosure relate to outputting information on a series of operations to be performed on a text from a user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes a dividing unit that divides a text from a user into multiple segments, an acquisition unit that acquires information on multiple predetermined operations, an associating unit that associates one of the predetermined operations with each of the segments in accordance with the segments and the information on the predetermined operations, and an output unit that outputs information on a series of the predetermined operations associated with the segments.

BRIEF DESCRIPTION OF THE DRAWINGS

Exemplary embodiment of the present disclosure will be described in detail based on the following figures, wherein:

FIGS. 5A and 5B illustrate an example of information stored on a flow operation management database (DB);

DETAILED DESCRIPTION

Embodiment of the disclosure is described in detail below with reference to the drawings.

Figure 1:
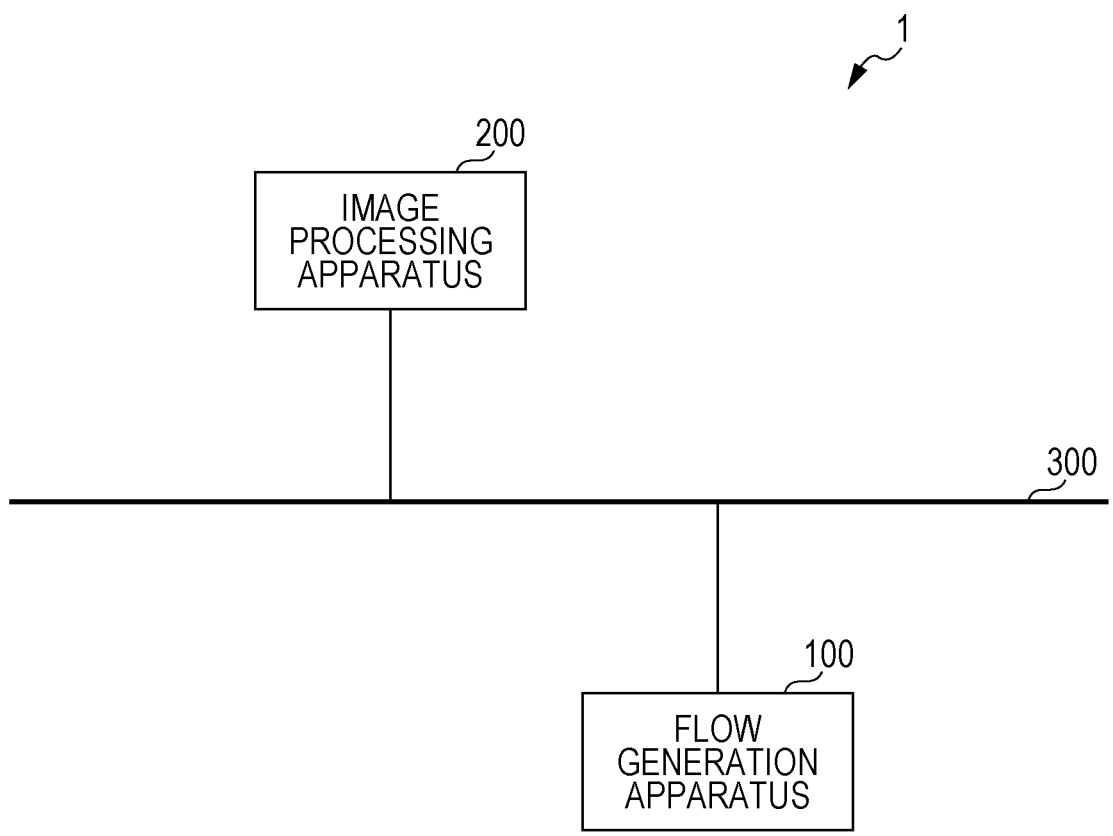
FIG. 1 illustrates a whole configuration of a flow generation system of the exemplary embodiment.

FIG. 1 illustrates a whole configuration of a flow generation system 1 of the exemplary embodiment. Referring to FIG. 1, the flow generation system 1 includes a flow generation apparatus 100 and image processing apparatus 200. The flow generation apparatus 100 and image processing apparatus 200 are connected to a network 300. In accordance with the exemplary embodiment, the flow generation apparatus 100 and flow generation system 1 are used as an example of an information processing system.

The flow generation apparatus 100 is a computer that generates a flow in accordance with a text obtained from a user. For example, the flow generation apparatus 100 receives a text from the user or outputs information on a flow corresponding to the received text.

The text typically includes multiple sentences consecutively lined. In the context of the disclosure, the text from the user may include one sentence or may include at least one word.

The flow represents a series of operations. Specifically, in a job, the flow indicates an operation flow to be executed in the job.

For example, the flow generation apparatus 100 may be a server or a personal computer (PC).

The image processing apparatus 200 performs image processing functions. The image processing functions include a print function, scanning function, copy function and fax function. The image processing apparatus 200 prints an image via the print function or transmits image data via the fax function.

FIG. 1 illustrates the single image processing apparatus 200. The number of image processing apparatuses 200 in use is not limited to one.

The network 300 is a communication medium used for communication between the flow generation apparatus 100 and the image processing apparatus 200. For example, the network 300 may include the Internet, public telephone network, and/or local-area network (LAN).

Figure 2:
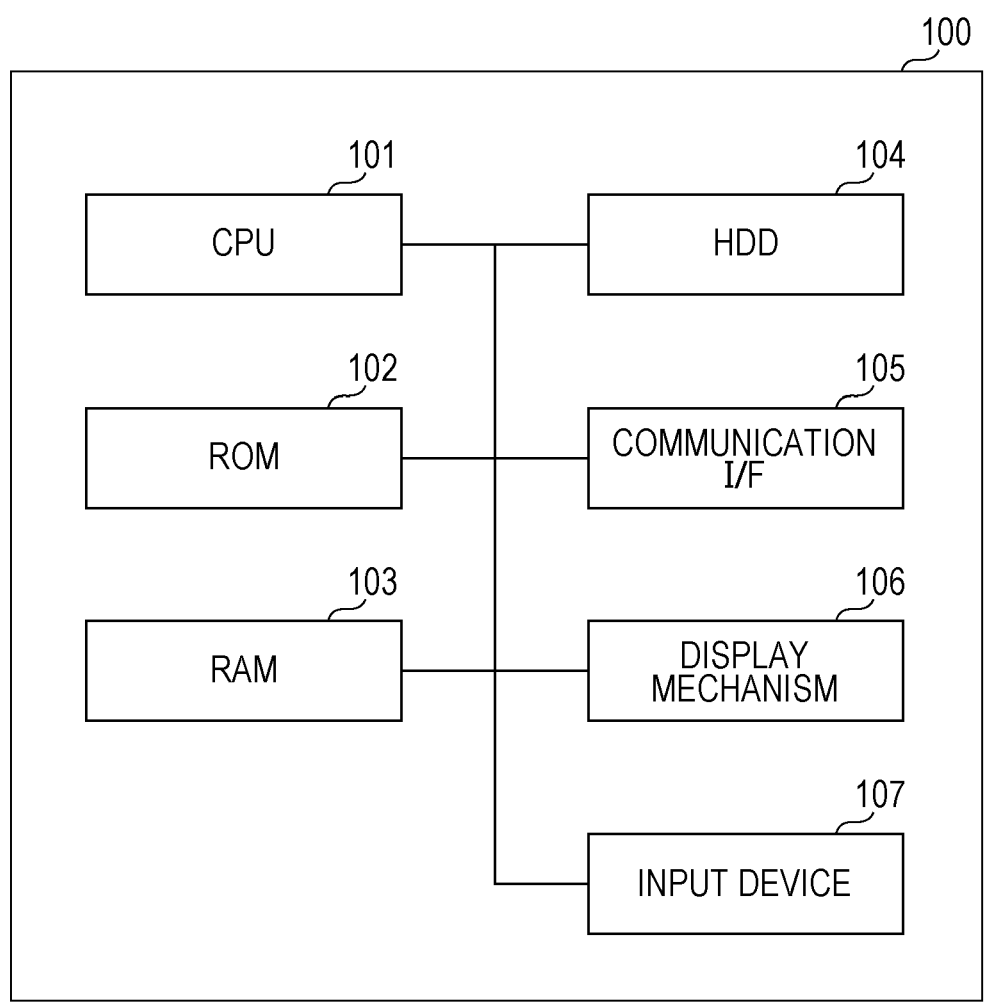
FIG. 2 illustrates a hardware configuration of the flow generation system of the exemplary embodiment.

FIG. 2 illustrates a hardware configuration of the flow generation apparatus 100 of the exemplary embodiment.

Referring to FIG. 2, the flow generation apparatus 100 includes a central processing unit (CPU) 101 serving as an arithmetic unit, a read-only memory (ROM) 102 that serves an execution area of a program, such as a basic input output system (BIOS), and a random-access memory (RAM) 103 that is a working area of the program. The flow generation apparatus 100 further includes a hard disk drive (HDD) 104 that serves as a memory area that stores a variety of programs including an operating system (OS) and applications, data input to the programs, and data output from the programs. The program stored on the ROM 102 or HDD 104 is read onto the RAM 103 and then executed by the CPU 101. The functions of the flow generation apparatus 100 are thus implemented.

The flow generation apparatus 100 further includes a communication interface (I/F) 105 for communication, a display mechanism 106, and an input device 107 including a keyboard, mouse, and/or touch panel.

Figure 3:
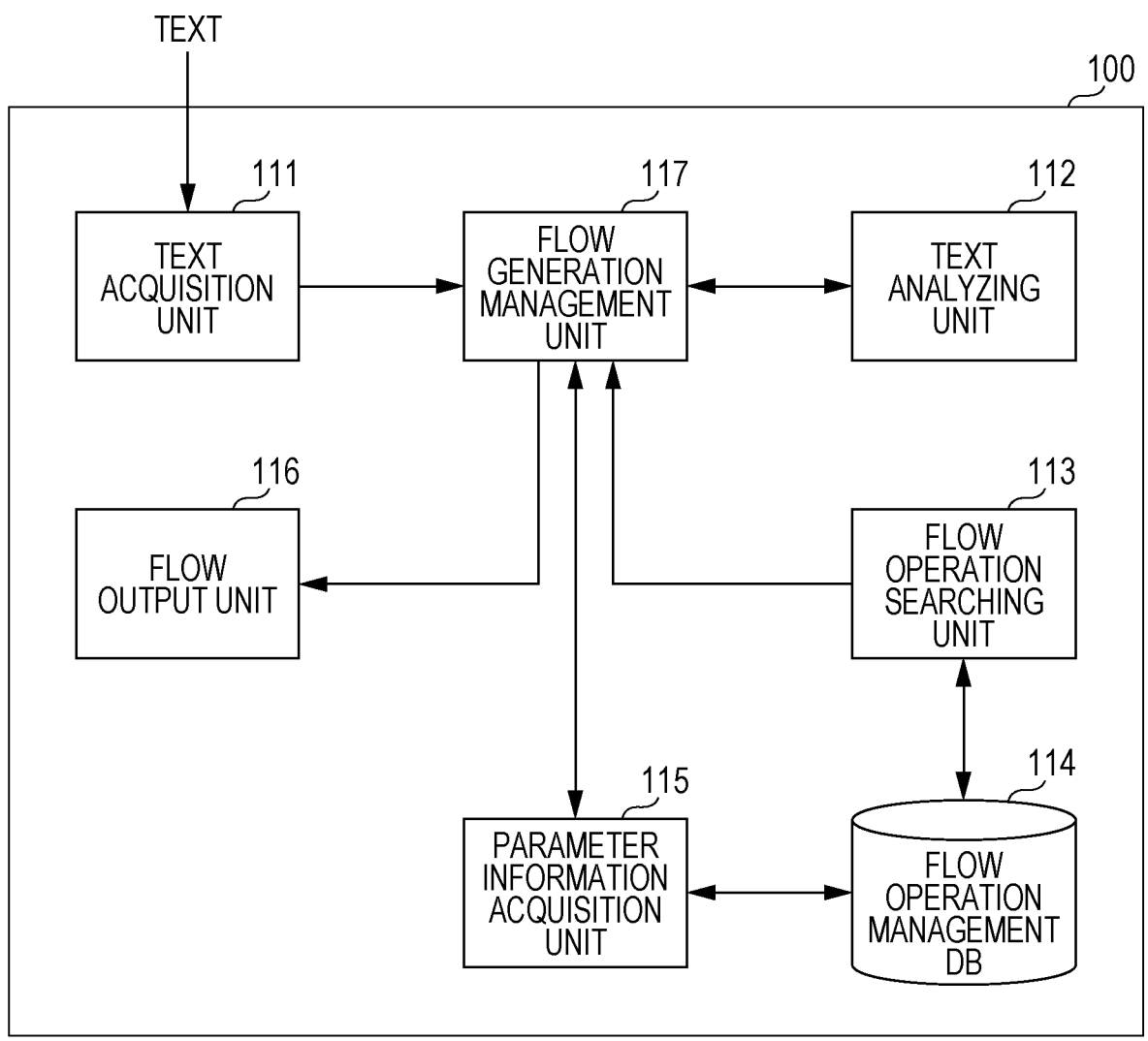
FIG. 3 is a block diagram illustrating a functional configuration of the flow generation system of the exemplary embodiment.

The functional configuration of the flow generation apparatus 100 of the exemplary embodiment is described below. FIG. 3 is a functional block diagram of the flow generation apparatus 100 of the exemplary embodiment. The flow generation apparatus 100 of the exemplary embodiment includes a text acquisition unit 111, text analyzing unit 112, flow operation searching unit 113, flow operation management database (DB) 114, parameter information acquisition unit 115, flow output unit 116, and flow generation management unit 117.

The text acquisition unit 111 acquires a text from a user. When the user inputs the text by using the input device 107, the text acquisition unit 111 acquires the input text. The method of acquiring the text is not limited to the method in which the user uses the input device 107. For example, the user verbally expresses the text and the text acquisition unit 111 picks up the voice of the user.

The text analyzing unit 112 analyzes the text acquired by the text acquisition unit 111 and divides the text into multiple sentence segments. For example, the text analyzing unit 112 extracts a sentence segment having a specific meaning from the text by using syntactic analysis or semantic analysis in the related art. The text analyzing unit 112 thus divides the text into the extracted sentence segments.

In the following discussion, the text analyzing unit 112 divides the text into multiple sentence segments. The sentence segment is a unit according to which the text is divided. In accordance with the exemplary embodiment, the unit of division of the text may include at least one word.

The flow operation searching unit 113 searches for an operation corresponding to a sentence segment divided by the text analyzing unit 112 from among multiple predetermined operations stored on the flow operation management DB 114.

Specifically, the flow operation searching unit 113 acquires information on the predetermined operations stored on the flow operation management DB 114. By using the sentence segments divided by the text analyzing unit 112 and the information on the predetermined operations stored on the flow operation management DB 114, the flow operation searching unit 113 associates one of the predetermined operations with each of the sentence segments. A flow corresponding to the text from the user is generated by associating the operation with each of the sentence segments.

The flow operation management DB 114 stores the predetermined operations. The operation stored herein becomes an operation candidate forming a flow. Each of the operations stored on the flow operation management DB 114 defines the type of the operation, name of the operation, type of a parameter used when the operation is performed (hereinafter simply referred to as a "parameter"), and acquisition procedure of the parameter.

For example, the type of the operation may be "input", "processing", or "delivery". The input operation is used to input data. The processing operation is used to process data. The delivery operation is used to deliver data. In accordance with the exemplary embodiment, the parameter is an example of a variable.

The parameter information acquisition unit 115 acquires information on the parameter for each of the operations of the generated flow. Specifically, the parameter information acquisition unit 115 acquires the information on the acquisition procedure of the parameter from the flow operation management DB 114. In accordance with the acquisition procedure of the parameter, the parameter information acquisition unit 115 acquires the information on the parameter.

The parameter acquired is related to the environment of the flow generation system 1 and, for example, includes the user setting on the flow generation apparatus 100 and the function implemented by the image processing apparatus 200.

The parameter information acquisition unit 115 acquires, as the parameter, account information on each of a variety of cloud services from a database managing the account information. The user may use the cloud service without manually entering the account information.

The flow output unit 116 outputs information on the flow corresponding to the text from the user. The flow output unit 116 also outputs the information on the parameter that is used in each operation of the flow. The information to be output is displayed on a display of the display mechanism 106 to the user. The information to be output may also be stored on a storage region of the HDD 104.

The flow generation management unit 117 manages the generation of the flow. Specifically, the flow generation management unit 117 receives the text from the text acquisition unit 111. The flow generation management unit 117 transfers the received text to the text analyzing unit 112 and then receives sentence segments as division results into which the text is divided. The flow generation management unit 117 transfers the divided sentence segments to the flow operation searching unit 113 and then receives the generated flow. The flow generation management unit 117 transfers the operations of the flow to the parameter information acquisition unit 115 and then receives the information on the parameters of each operation from the parameter information acquisition unit 115. The flow generation management unit 117 transfers to the flow output unit 116 the information on the flow and the information on the parameter of each operation forming the flow.

The elements forming the flow generation apparatus 100 are implemented when software resources and hardware resources cooperate with each other. For example, if the flow generation apparatus 100 is implemented by the hardware configuration in FIG. 2, a variety of programs stored on the ROM 102 or the HDD 104 is read onto the RAM 103 and then executed by the CPU 101. The functions of the text acquisition unit 111, text analyzing unit 112, flow operation searching unit 113, parameter information acquisition unit 115, flow output unit 116, and flow generation management unit 117 in FIG. 3 are thus implemented. The flow operation management DB 114 is implemented by the HDD 104.

In accordance with the exemplary embodiment, the text analyzing unit 112 is an example of a dividing unit. The flow operation searching unit 113 is an example of an acquisition unit and an associating unit. The flow output unit 116 is an example of an output unit.

Figure 4:
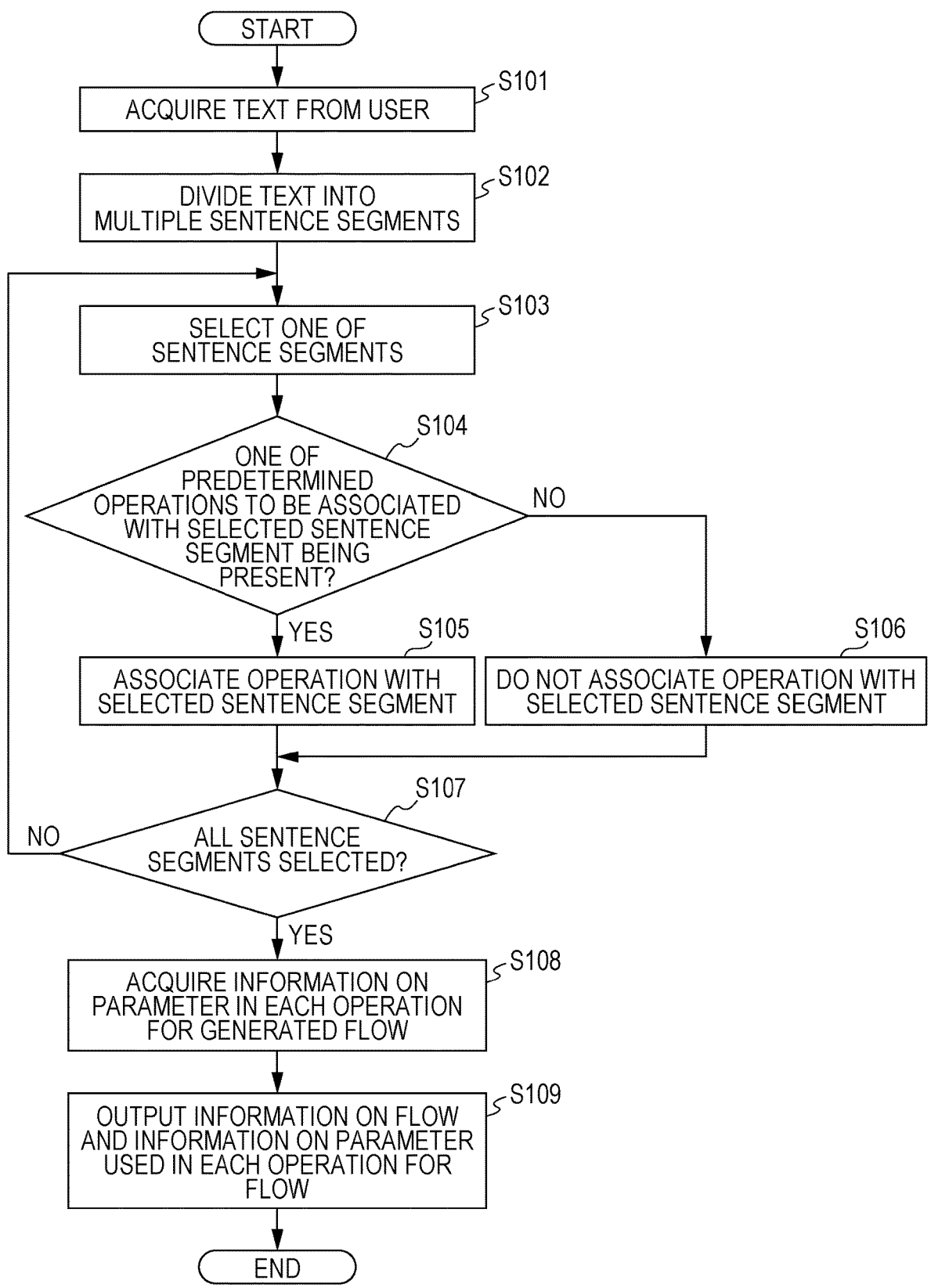
FIG. 4 is a flowchart illustrating an output process of information on a flow in accordance with a text from a user.

The process of outputting the information on the flow in accordance with the text from the user is described below. FIG. 4 is a flowchart illustrating an output process to output the information on the flow in accordance with a text from a user. In the following discussion, each step number of the process begins with "S" denoting the word step.

The text acquisition unit 111 acquires a text from the user (S101). The text analyzing unit 112 analyzes the text from the user and divides the text into multiple sentence segments (S102). The flow operation searching unit 113 selects one of the sentence segments (S103). Based on the selected sentence segment and the information on the predetermined operations stored on the flow operation management DB 114, the flow operation searching unit 113 determines whether an operation to be associated with the selected sentence segment is present among the predetermined sentence segments (S104).

If the determination in S104 is affirmative (yes), the flow operation searching unit 113 associates the operation with the selected sentence segment (S105). If the determination in S104 is non-affirmative (no), the flow operation searching unit 113 does not associate any operation with the selected sentence segment (S106).

Subsequent to S105 or S106, the flow operation searching unit 113 determines whether all the sentence segments are selected (S107).

If the determination in S107 is non-affirmative (no), processing returns to S103. If the determination in S107 is affirmative (yes), the flow corresponding to the text from the user has been generated.

The parameter information acquisition unit 115 acquires the information on the parameter for each operation of the generated flow (S108). The flow output unit 116 then outputs information on the flow corresponding to the text from the user and the information on the parameter used in each operation of the flow (S109). The process thus ends.

Information stored on the flow operation management DB 114 is scribed. FIGS. 5A and 5B illustrate an example of the information stored on the flow operation management DB 114.

Each operation includes columns for "type", "operation name", "parameter", and "acquisition procedure".

The type indicates the type of each operation. Each operation is sorted into the types of "input", "processing", and "delivery". The operation name is the name of the operation. The parameter is a parameter used when the operation is performed. Note that the operation name "automatic upright standing" does not have any parameter. The acquisition procedure indicates a procedure to acquire the parameter. For example, in optical character recognition (OCR), multiple steps are registered as the acquisition procedure. In such a case, a step having a smaller step number is executed earlier to acquire a parameter.

Furthermore, the operation name "folder input" includes two parameters "input folder" and "access right". In accordance with the acquisition procedure, the parameter information acquisition unit 115 acquires, as the parameter for the input folder, information on a default (initially set) folder. For example, the default folder is a folder of my document of a flow generating user (namely, a user who operates to generate the flow). In accordance with the acquisition procedure, the parameter information acquisition unit 115 acquires information on the flow generating user as the parameter for the access right.

The information on the flow operation management DB 114 may be stored on another apparatus different from the flow generation apparatus 100 and the parameter information acquisition unit 115 may acquire a variety of information from the other apparatus.

A process of outputting flow information in accordance with the text from the user is specifically described. FIGS. 6A and 6B and FIGS. 7A and 7B illustrate specific examples of a process to output the flow information (the information on the flow) in accordance with the text from the user. The user here enters the text by using the input device 107.

Figure 6A:
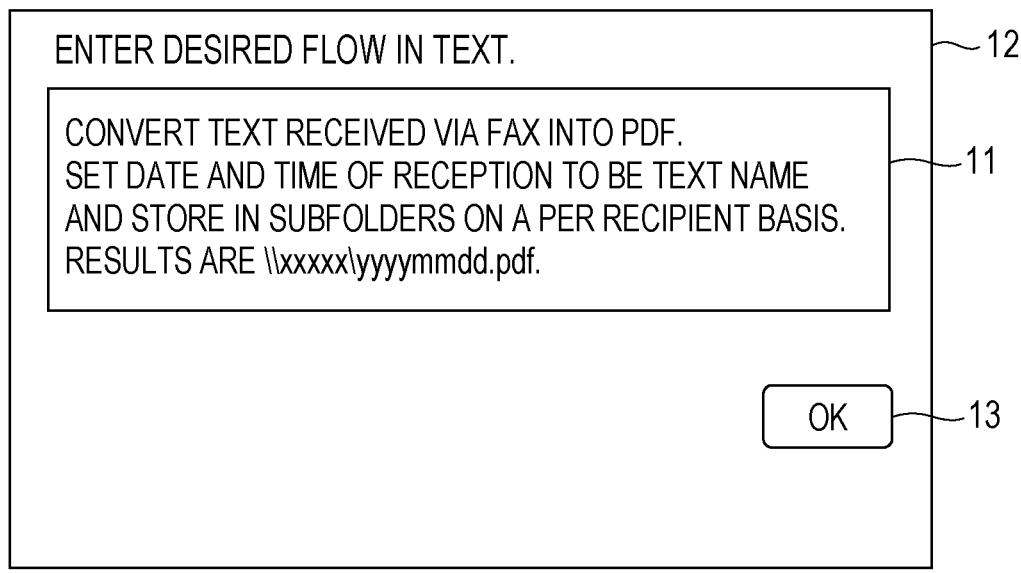
FIGS. 6A and 6B illustrate specific examples of an output process to output flow information in accordance with the text from the user.

Referring to FIG. 6A, the display of the display mechanism 106 displays a flow generation screen 12 laid out in an input form 11 that receives the text. The user enters in the input form 11 the text serving as a flow generation target. In this example, an entered text is "Convert text received via fax into PDF. Set date and time of reception to be text name and store in subfolders on a per recipient basis. Results are $$xxxxx$yyyymmdd.pdf." If the user selects an OK button 13, the process in FIG. 4 starts.

If the user has selected the OK button 13, the text acquisition unit 111 acquires the text reading "Convert text received via fax into PDF. Set date and time of reception to be text name and store in subfolders on a per recipient basis. Results are $$xxxxx$yyyymmdd.pdf."

The text analyzing unit 112 analyzes the acquired text and divides the text into multiple sentence segments. In this case, the text is divided into five sentence segments "Text received via fax", "convert into PDF", "Set date and time of reception to be text name", "Store in subfolders on a per recipient basis", and "Results are $$xxxxx$yyyymmdd.pdf".

The flow operation searching unit 113 associates one of the predetermined operations with each of the five sentence segments in accordance with the five sentence segments and the information on the predetermined operations stored on the flow operation management DB 114. For example, the flow operation searching unit 113 associates each of the five sentences with an operation having a higher similarity with the sentence segment.

Specifically, the flow operation searching unit 113 divides each operation name into finer word unit in connection with the operations stored on the flow operation management DB 114. For example, "fax receive" is divided into "fax" and "receive". For example, "confidential box" is divided into "confidential" and "box". For example, "folder input" is divided into "folder" and "input".

The words "fax", "receive", "confidential", "box", "folder", and "input" serving as a unit of division are predetermined. The flow operation searching unit 113 divides the operation name of each operation into predetermined word units.

It is possible that the flow operation searching unit 113 does not divide the text. Instead, pre-divided words may be stored on the flow operation management DB 114. For example, concerning the term "fax receive", the word "fax" and the word "receive" are stored as the division results.

The flow operation searching unit 113 searches for the divided operation name for each of the five sentence segments. For example, the flow operation searching unit 113 performs searching on the sentence segment "Text received via fax" with each of the operation names "fax receive", "confidential box", and "folder input" in sequence.

For example, if the searching is performed with the operation name "fax receive", the flow operation searching unit 113 performs searching on whether the word fax and/or receive is present in the sentence segment "Text received via fax". If the searching is performed with the operation name "confidential box", the flow operation searching unit 113 performs searching on whether the word confidential and/or box is present in the sentence segment "Text received via fax". In this way, if the whole or part of the operation name is included in the sentence segment, the flow operation searching unit 113 determines that the sentence segment is similar to the operation (operation name) and thus associates the operation with the sentence segment.

The sentence segment "Text received via fax" includes two words "fax" and "received" of the operation name. The flow operation searching unit 113 thus associates the sentence segment "Text received via fax" with the operation "fax receive".

The sentence segment "Convert into PDF" includes the word "convert" of the operation name "format convert". On the other hand, the sentence segment "Convert into PDF" does not include a word of the operation name of another operation. The flow operation searching unit 113 thus associates the sentence segment "Convert into PDF" with the operation "format convert".

Similarly, the flow operation searching unit 113 associates the sentence segments "Set date and time of reception to be text name" and "store in subfolders on a per recipient basis" with the operations of "text name" and "folder store", respectively.

A threshold value (for example, 70%) may be set in a similarity determination. Even if a subpart of the operation name is included in the sentence segment, the ratio of the words included in the sentence segment may be less than the threshold value. In such a case, the operation is determined to have no similarity with the sentence segment. For example, the sentence segment "Convert into PDF" includes only the word convert out of the two words "convert" and "format". The ratio is 50%. Since this ratio is smaller than a threshold value of 70%, the sentence segment "Convert into PDF" has no similarity to the operation "format convert". The flow operation searching unit 113 does not associate the sentence segment "Convert into PDF" with the operation "format convert".

The sentence segment "store in subfolders on a per recipient basis" includes all words of the operation name "folder store", namely, the words "folder" and "store". The operation name "folder store" becomes a candidate as an operation to be associated. This sentence segment also includes the word folder of the operation name "folder input" and the operation having the operation name "folder input" becomes a candidate to be associated. If multiple candidates to be associated with the sentence segment are present, the flow operation searching unit 113 may associate the operation with the sentence segment in accordance with a predetermined rule or may have an option not to associate the operation with the sentence segment.

In accordance with the predetermined rule, the flow operation searching unit 113 selects an operation having the operation name including the words having the highest ratio of inclusion in the sentence segment. For example, since all the two words, namely, the words folder and store of the operation name "folder store" are included, the ratio is 100%. As another example, only the one word folder of the operation name "folder input" is included, the ratio is 50%. The flow operation searching unit 113 thus associates the operation "folder store" with the sentence segment.

The predetermined rule is not limited to the one described above. For example, a rule may be that the operation having the largest number of words included in the sentence segment is associated with the sentence segment. Another rule may be that the status of another sentence segment is referenced. Specifically, if the operation having the type "input" is associated with another sentence segment, the sentence segment "store in subfolders on a per recipient basis" is associated with the operation "folder store" in the type "delivery" other than the type input. For example, the sentence segment "store in subfolders on a per recipient basis" is not typically a sentence segment appearing at the head of the text and the operation "folder store" in the type "delivery" other than the type "input" is associated.

The sentence segment "Results are $$xxxxx$yyyymmdd.pdf." does not include any word in each of the operation names. The flow operation searching unit 113 thus determines that there is no operation that is to be associated with the sentence segment "Results are $$xxxxx$yyyymmdd.pdf". Thus, no operation is associated with this sentence segment.

In the above process, the operations of fax receive, format convert, text name, and folder store are successively associated with the text from the user. Specifically, a series of operations of fax receive, format convert, text name, and folder store is generated as a flow.

When the operation is associated with the sentence segment, the operation name may be replaced with a word having a similar meaning. Words similar in meaning to the operation name "fax receive" may include the word facsimile. If a sentence segment includes the word facsimile or receive, the operation "fax receive" may be associated with.

In the search results, the same operation may be associated with multiple sentence segments. In such a case, the same operation is not repeated in a single flow and a sentence segment having the highest similarity to the operation may be selected from among the sentence segments.

The method of associating the operation with the sentence segment is not limited to the method in which the operation name is divided into words and a word in the operation name is searched for. For example, on each operation, a condition used to associate the operation may be predetermined. If a sentence segment satisfies the condition, the flow operation searching unit 113 associates the operation satisfying the predetermined condition with the sentence segment. For example, concerning the operation "fax receive", a condition that the sentence segment includes two words "fax" and "receive" may be set.

The parameter information acquisition unit 115 acquires information on the parameter of each operation in the generated flow. In accordance with the acquisition procedure of the operations stored on the flow operation management DB 114, the parameter information acquisition unit 115 acquires the information on the parameter in each operation.

The sentence segment "Text received via fax" is associated with the operation "fax receive". Referring to FIGS. 5A and 5B, the parameter information acquisition unit 115 searches for the image processing apparatus 200 having a fax function on a network 300 via broadcasting. If one image processing apparatus 200 is detected in the search results, the parameter information acquisition unit 115 acquires the information on the image processing apparatus 200 as the parameter for fax receive. The image processing apparatus 200 is set as a fax recipient. If multiple image processing apparatuses 200 are detected, the information on all the image processing apparatuses 200 is acquired as the parameter for the fax receive. Note that the image processing apparatus 200 as a fax recipient is in an unselected state.

The operation "format convert" is associated with the sentence segment "Convert into PDF". Referring to FIGS. 5A and 5B, the parameter information acquisition unit 115 acquires a file format written in the text. In this example, the format PDF is written in the text from the user. The parameter information acquisition unit 115 acquires PDF as the parameter for format convert.

The information on the file format is registered in advance and the parameter information acquisition unit 115 searches the text for the registered file format.

The sentence segment "Set date and time of reception to be text name" is associated with an operation "text name". Referring to FIGS. 5A and 5B, the parameter information acquisition unit 115 determines whether the text includes the indication indicating the association. In this case, the indication indicates that the date and time of reception is set to be the text name. The parameter information acquisition unit 115 thus acquires the date and time of reception as the parameter "text name".

The operation "folder store" is associated with the sentence segment "store in subfolders on a per recipient basis". Referring to FIGS. 5A and 5B, the parameter information acquisition unit 115 acquires information on four parameters "output folder", "subfolder", "access right", and "delivery condition". In this example, the parameter information acquisition unit 115 acquires information on my document for "output folder", information on the folder of the recipient for "subfolder", and the parameter for a flow generating user for "access right". Concerning "delivery condition", the sentence segment "store in subfolders on a per recipient basis" does not include a condition indicating that AA is BB, and the parameter information acquisition unit 115 acquires no parameter.

Figure 6B:
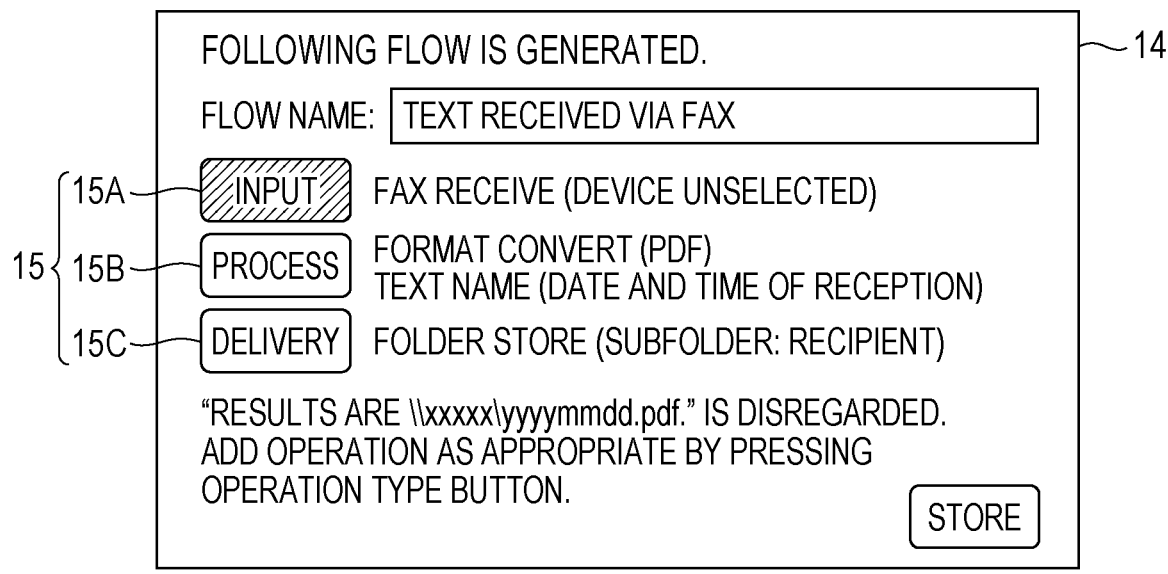

Referring to FIG. 6B, the flow output unit 116 outputs information on the generated flow (namely, the flow information corresponding to the text from the user) and information on a parameter used in each operation of the flow. In this example, the display of the display mechanism 106 displays a flow generation result screen 14 including the information on the flow and the information on the parameter. If the user selects the OK button 13 (see FIG. 6A), the process in FIG. 4 is performed, displaying the flow generation result screen 14.

The operations of the generated flow are successively displayed in an order of sequence on the flow generation result screen 14. The order of sequence is the order of description of the sentence segments of the operations in the text from the user. The order of sequence is also the order of execution of the operations. The operations are sorted according to type and then displayed. The parameter of each operation is also displayed.

The operations "fax receive", "format convert", "text name", and "folder store" are displayed in this order of sequence as the operations of the flow.

The operation "fax receive" is displayed as the operation sorted as the type "input". Information on an apparatus able to receive fax is acquired as the parameter for the operation "fax receive". Since a recipient apparatus of fax is unselected, "device unselected" is displayed.

The operation "format convert" and "text name" are displayed as the operations in the type "processing". PDF is displayed as the parameter for the operation of the format convert. "Date and time of reception" is displayed as the parameter for the operation "text name".

The operation "folder store" is displayed as the operation sorted as the type "delivery". The parameter for the operation "folder store" displayed indicates that subfolder is the folder of the recipient. The parameters for the operation "folder store" include parameters "output folder", "access right", and the like. In this example, only the parameter "subfolder" is displayed.

A flow name is a name attached to the generated flow. For example, the flow name is the first ten characters of the text from the user or a character string that is a combination of words searched and found by the flow operation searching unit 113. In this example, the first ten characters "text receiv" of the text from the user are attached to the generated flow.

The sentence segment "Results are $$xxxxx$yyyymmdd.pdf" is not associated with any operation. An alert message reading "'the sentence segment "Results are $$xxxxx$yyyymmdd.pdf" is neglected" is displayed, indicating that the sentence segment is not associated with any operation.

The flow generation result screen 14 includes operation type buttons 15 corresponding to the types of the operations, including an operation type button 15A for "input" (input operation type button 15A), an operation type button 15B for "processing" (processing type operation button 15B), and an operation type button 15C for "delivery" (delivery operation type button 15C). The user may delete or add an operation on a per type basis or edit a parameter by selecting one of the operation type buttons 15.

The operation "fax receive" sorted as the type "input" has the parameter in the state of "device unselected". Specifically, to perform the operation "fax receive", an apparatus as a fax recipient is to be set up. If an operation having the information on the parameter to be edited is present, the operation type button 15 for that operation may be displayed in a different form from another of the operation type buttons 15 (the operation type button 15 of the operation that is free from editing the information on the parameter). Referring to FIG. 6B, the input operation type button 15A is displayed in a more highlighted way than the processing type operation button 15B and delivery operation type button 15C. More specifically, the input operation type button 15A is displayed in red while the processing type operation button 15B and delivery operation type button 15C are displayed in blue.

Figure 7A:
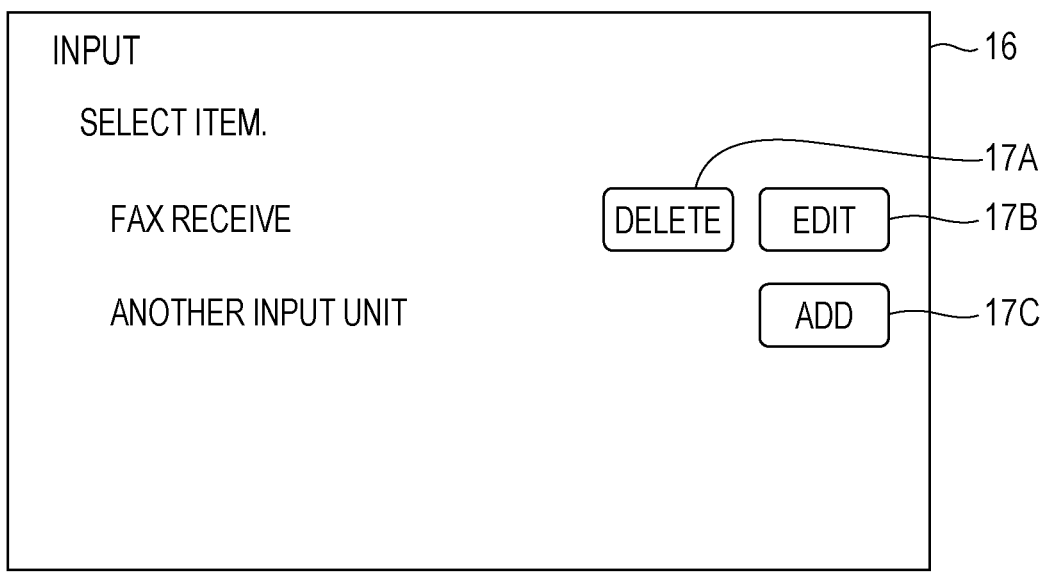
FIGS. 7A and 7B illustrate specific examples of an output process to output flow information in accordance with the text from the user.

When the user has selected the input operation type button 15A, an item edit screen 16 for the type input is displayed as illustrated in FIG. 7A. In the type input, an operation may be deleted or added and a parameter may be edited on the item edit screen 16.

Figure 7B:
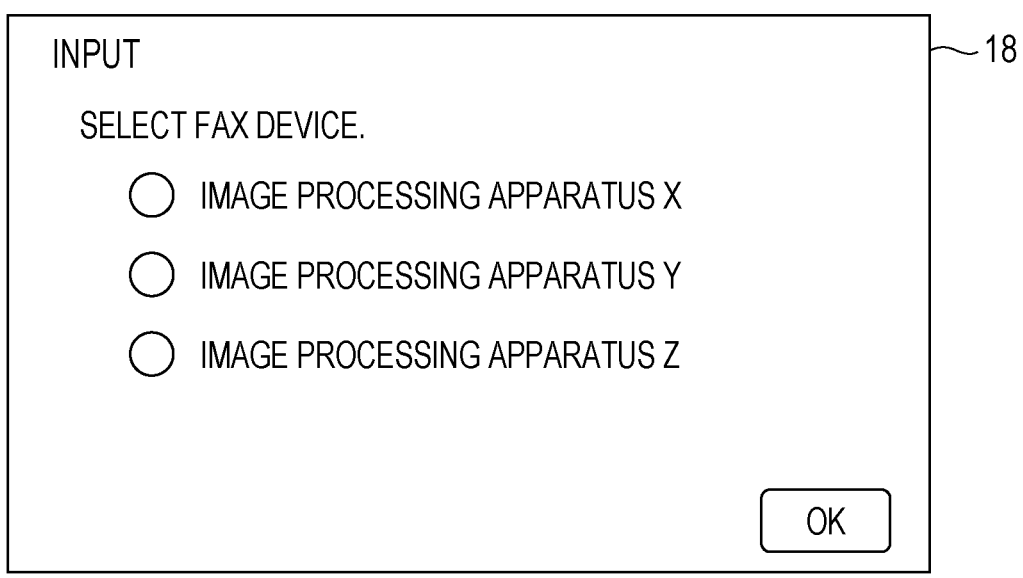

The operation "fax receive" is displayed as the operation in the type "input" and for the operation "fax receive", a delete button 17A and an edit button 17B are arranged. If the user has selected the delete button 17A, the operation "fax receive" is deleted from the generated flow. If the user has selected the edit button 17B, an input parameter edit screen 18 is displayed as illustrated in FIG. 7B. Three apparatuses able to receive fax are displayed as the parameter "fax receive". If the user has selected one of the three apparatuses, the selected apparatus is set up as a fax recipient apparatus.

The item edit screen 16 in FIG. 7A further includes an add button 17C. By selecting the add button 17C, the user may add an operation to the generated flow. For example, when the user selects the add button 17C, a list of operations for "input" stored on the flow operation management DB 114 is displayed. If the user selects one or more operations from the displayed list, the selected operation is added to the generated flow. The user may specify the order of the operations added. For example, the user may specify the addition of an operation prior to or subsequent to the operation "fax receive".

Referring to FIGS. 7A and 7B, the item edit screen 16 and the parameter edit screen 18 are described for the type "input". For the types "processing" and "delivery" as well, the item edit screen 16 and the parameter edit screen 18 may be present. In the item edit screen 16 and the parameter edit screen 18 for each of the types, the user may delete or add an operation or edit a parameter.

The flow output unit 116 may issue an alert message if there is no operation that is sorted as a predetermined type from among multiple types.

For example, types "input" and "delivery" out of the types "input", "processing", and "delivery" are predetermined to be standard types. For example, since operations sorted as the types "input" and "delivery" are present in the generated flow on the flow generation result screen 14 in FIG. 6B, no alert message is issued. For example, if the operation "fax receive" is not present, there is no operation sorted as the type "input". The flow output unit 116 thus displays an alert message. If no operation is present for "folder store", no operation sorted as the type "delivery" is present. An alert message is thus displayed.

If the flow operation searching unit 113 has searched for an operation corresponding to a sentence segment and has hit multiple candidates for the operation corresponding to the sentence segment, the flow output unit 116 may output the information on the multiple candidates.

The flow output unit 116 may display the information on the operations serving as candidates to be associated with the sentence segment. The flow output unit 116 may also issue an alert message telling that multiple candidates are present for the operation to be associated with the sentence segment. In such a case, the user may simply select any of the candidates as the operation to be associated with the sentences segment.

The flow output unit 116 may associate one of the candidates with the sentence segment and display an alert message indicating another candidate is still present. In such a case, the user may select another candidate as an operation to be associated with the sentence segment in place of the first candidate.

If multiple operations in the type "processing" are present as operation candidates to be associated with the sentence segment, the flow output unit 116 may display the processing type operation button 15B (see FIG. 68) in a form different from the input operation type button 15A and the delivery operation type button 15C. In this case, as well, the user may simply select one from the operation candidates in the type processing as an operation to be associated with the sentence segment.

Figure 8A:
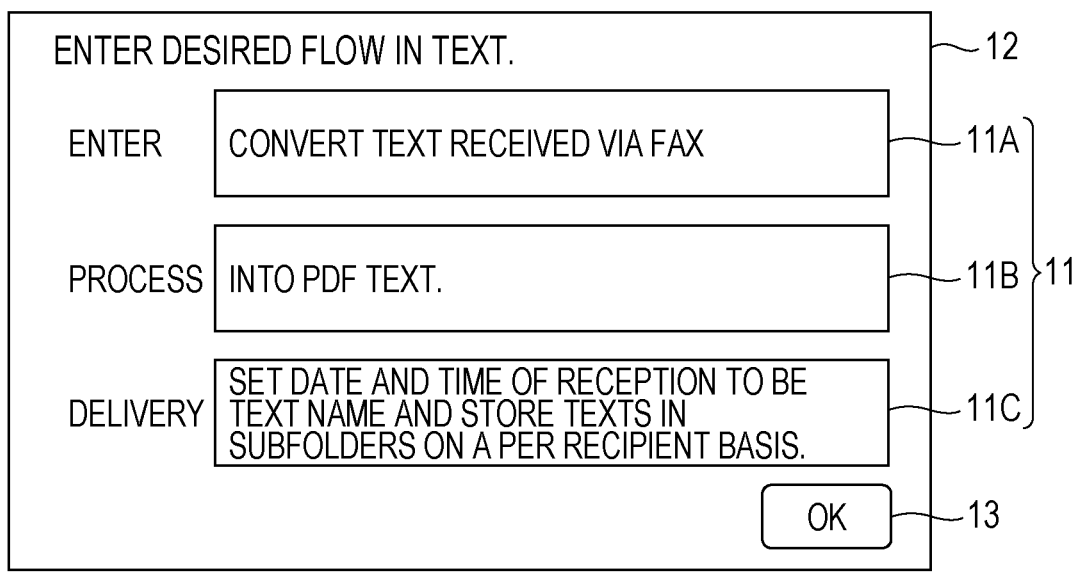
FIG. 8A illustrates an example of a flow generation screen and FIG. 8B illustrates an example of a flow generation result screen.

FIG. 8A illustrates another example of the flow generation screen 12. FIG. 88 illustrates another example of the flow generation result screen 14.

An input form 11 that receives the text is arranged on the flow generation screen 12 on a per type basis as illustrated in FIG. 8A. The text is thus received in a form separate from type to type. For example, an input form 11A receives a text portion corresponding to the type input. An input form 11B receives a text portion corresponding to the type processing. An input form 11C receives a text portion corresponding to the type delivery.

In accordance with the exemplary embodiment, the input forms 11 that receive the text in a form separate from type to type is an example of a receiving unit.

The input form 11A receives the text "Text received via fax". The input form 11B receives the text "convert into PDF". The input form 11C receives the text "Set date and time of reception to be text name and store texts in subfolders on a per recipient basis".

If the user selects the OK button 13, the process in FIG. 4 starts.

The text analyzing unit 112 further divides into one or more sentence segments in the input forms 11A through 11C the text entered on a per type basis.

The flow operation searching unit 113 associates the operations stored on the flow operation management DB 114 with the sentence segments divided according to type. The flow operation searching unit 113 searches the sentence segment for the operations with the same type of operation with higher priority.

For example, the text "Text received via fax" entered in the input form 11A is sorted as the type input. The analysis results of the text analyzing unit 112 are not further divided. Concerning the text "Text received via fax", the flow operation searching unit 113 searches for an operation in the type input with higher priority stored on the flow operation management DB 114.

Figure 8B:
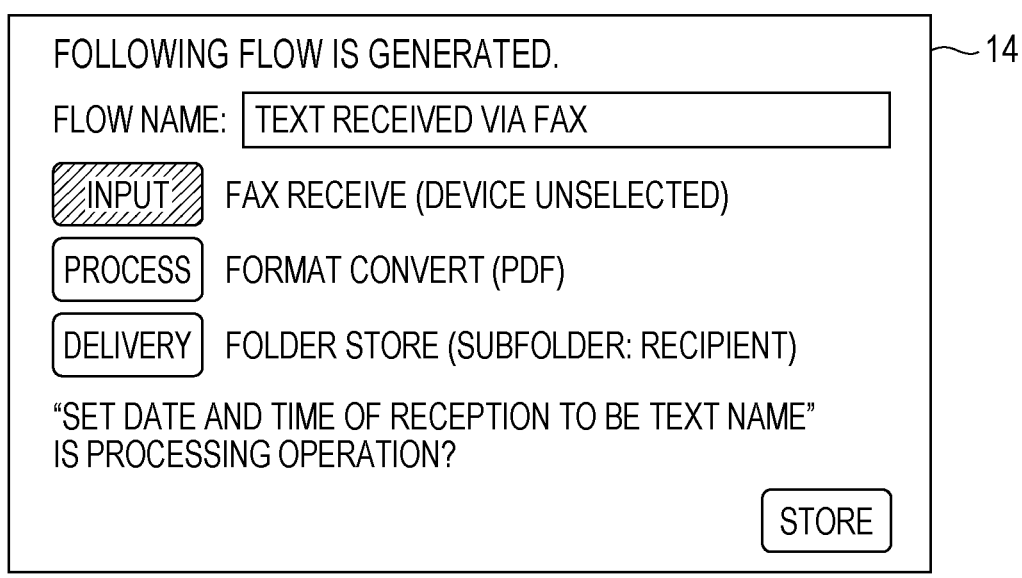

Referring to FIGS. 5A and 5B, the operation names "fax receive", "confidential box", and "folder input" are searched in that order. Since the sentence segment "Text received via fax" has a similarity with the operation "fax receive", the flow operation searching unit 113 associates the operation "fax receive" with the sentence segment "Text received via fax". Referring to the flow generation result screen 14 in FIG. 8B, "fax receive" is displayed as the operation sorted as the type input.

The text "Set date and time of reception to be text name and store texts in subfolders on a per recipient basis" entered into the input form 11C is sorted as the type delivery. The analysis results of the text analyzing unit 112 indicate that the text is divided into two sentence segments, namely, sentence segments "Set date and time of reception to be text name" and "store texts in subfolders on a per recipient basis". Concerning each of the sentence segments "Set date and time of reception to be text name" and "store texts in subfolders on a per recipient basis", the flow operation searching unit 113 searches with higher priority for operations in the type delivery stored on the flow operation management DB 114.

Referring to FIGS. 5A and 5B, the operation names "printer output", "mail transmit", and "folder store" are searched in that sequential order. Since the sentence segment "store texts in subfolders on a per recipient basis" has similarity with the operation "folder store", the flow operation searching unit 113 associates the operation "folder store" with the sentence segment. The flow generation result screen 14 in FIG. 8 displays "folder store" as the operation sorted as the type delivery.

The sentence segment "Set date and time of reception to be text name" does not include any of the operation names in the type delivery and there is no operation having similarity. In this case, there is a possibility that the user may have entered the text in an erroneous type in the input form 11. The flow output unit 116 thus issues an alert message.

The alert message indicates that there is no operation in the type delivery to be associated with the sentence segment "set date and time of reception to be text name".

The flow operation searching unit 113 searches operations for other types, namely, for the types "input" and "processing". If an operation corresponding to the sentence segment "Set date and time of reception to be text name" is present, the flow operation searching unit 113 may output the information on the operation as an alert message. Specifically, the operation "text name" in the type processing has similarity with the sentence segment "Set date and time of reception to be text name". As in the flow generation result screen 14 in FIG. 8B, an alert message "'Set date and time of reception to be text name' is a processing operation?" is displayed. Through the alert message, the type of an operation serving as a candidate to be associated with the sentence segment "Set date and time of reception to be text name" is presented. In addition to or in place of the type processing, an operation candidate "text name" to be associated may be displayed.

If an operation in another type serving as a candidate to be associated is present for the sentence segment entered in the input form 11, the flow output unit 116 may display an alert message to indicate the type of an operation serving as a candidate to be associated and the information on the operation.

If the word "input" or "processing" as the type of the operation is not included in the sentence segment "Set date and time of reception to be text name", no operation serving as a candidate to be associated is present in the sentence segment "Set date and time of reception to be text name". In such a case, an alert message "'Set date and time of reception to be text name' is neglected" is displayed. The alert message thus notifies the user that no operation is associated, thereby indicating that no operation serving as a candidate to be associated is present.

The program implementing the exemplary embodiment may be provided by using a communication medium or in a stored form on a recording medium, such as a compact-disk read-only memory (CD-ROM).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system, comprising:
a processor programmed to function as:
dividing unit that divides a text that is input from a user into a plurality of segments, each of the plurality of segments having a different portion of text from the text input from the user;
an acquisition unit that acquires information on a plurality of predetermined operations;
an associating unit that associates one of the predetermined operations with each of the segments in accordance with the segments and the information on the predetermined operations; and
an output unit that outputs information on a series of the predetermined operations associated with the segments,
wherein the predetermined operations are sorted according to type,
wherein the output unit outputs the series of the predetermined operations after sorting the series of the predetermined operations according to type, and
wherein the output unit outputs an alert if no predetermined operation sorted into a predetermined type is present.

2. The information processing system according to claim 1, wherein the output unit outputs information on a variable used in execution of the series of the predetermined operations.

3. The information processing system according to claim 2, wherein an order of acquisition of variables used in each of the predetermined operations is determined, and
wherein the output unit outputs the information on the variables acquired in the order of acquisition for the series of the predetermined operations.

4. The information processing system according to claim 1, wherein the processor is further programmed to function as a receiving unit that receives the text in a state with the predetermined operations sorted and divided according to type.

5. The information processing system according to claim 4, wherein the dividing unit further divides a portion of the text divided into a type into one or more segments, and
wherein the output unit outputs an alert if a predetermined operation in the type to be associated with the segment is not present.

6. The information processing system according to claim 5, wherein the output unit outputs, in the alert, information on a predetermined operation of another type serving as a candidate to be associated with the segment.

7. The information processing system according to claim 1, wherein if a plurality of candidates for the predetermined operation to be associated with the segment are present, the output unit outputs information on the candidates.

8. A non-transitory computer readable medium storing a program causing a computer to execute a process for processing information, the process comprising:
dividing a text that is input from a user into a plurality of segments, each of the plurality of segments having a different portion of text from the text input from the user;
acquiring information on a plurality of predetermined operations;
associating one of the predetermined operations with each of the segments in accordance with the segments and the information on the predetermined operations; and
outputting information on a series of the predetermined operations associated with the segments,
wherein the predetermined operations are sorted according to type,
wherein the outputting outputs the series of the predetermined operations after sorting the series of the predetermined operations according to type, and
wherein the outputting outputs an alert if no predetermined operation sorted into a predetermined type is present.

9. An information processing system, comprising:
dividing means for dividing a text that is input from a user into a plurality of segments, each of the plurality of segments having a different portion of text from the text input from the user;

acquisition means for acquiring information on a plurality of predetermined operations;

associating means for associating one of the predetermined operations with each of the segments in accordance with the segments and the information on the predetermined operations; and output means for outputting information on a series of the predetermined operations associated with the segments, wherein the predetermined operations are sorted according to type, wherein the output means outputs the series of the predetermined operations after sorting the series of the predetermined operations according to type, and wherein the output means outputs an alert if no predetermined operation sorted into a predetermined type is present.

10. The information processing system according to claim 1, wherein each one of the predetermined operations is displayed as text on a user-selectable operation-type button adjacent to the respective associated segment of the plurality of segments.

* * * * *